Figure 1:
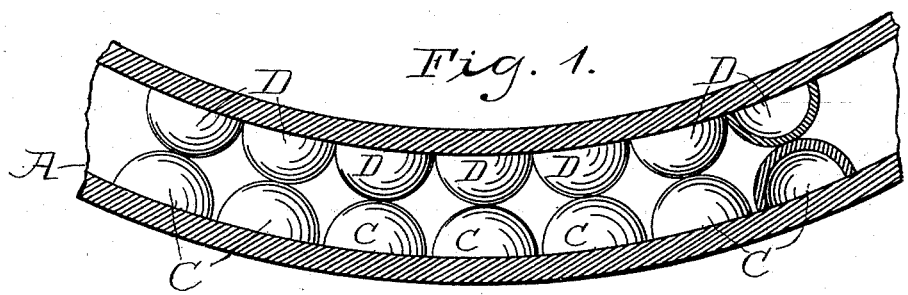

(No Model.)

J. H. BINGHAM.
TIRE FOR VEHICLE WHEELS.

No. 483,131. Patented Sept. 27, 1892.

Witnessed
A. A. Hall
Robert A. Pryor

Inventor:
John H. Bingham
By Frank D. Thomason
Atty.

UNITED STATES PATENT OFFICE.

JOHN HENRY BINGHAM, OF CHICAGO, ILLINOIS.

TIRE FOR VEHICLE-WHEELS.

SPECIFICATION forming part of Letters Patent No. 483,131, dated September 27, 1892.

Application filed October 6, 1891. Serial No. 407,868. (No model.)

*To all whom it may concern:*

Be it known that I, JOHN HENRY BINGHAM, of Chicago, Cook county, Illinois, have invented certain new and useful Improvements in Tires for Vehicle-Wheels, of which the following is a full, clear, and exact description, reference being had to the accompanying drawings, and to the letters of reference marked thereon.

My invention, while useful for all kinds of vehicle-wheels, is more particularly adapted for bicycles, and comes under that description of tires known as "cushion-tires." Its construction is such that it thoroughly avoids the bumping, jostling, and jar which is common in the cushion-tires now in extensive use, and at the same time it possesses the advantage of being light and non-collapsible, substantially as hereinafter fully described, and as illustrated in the drawings, in which—

Figure 2:
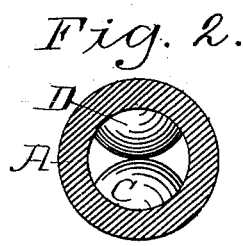

Figure 1 is a longitudinal central section through my improved tire. Fig. 2 is a transverse section of the same, and Fig. 3 is a longitudinal central section through a modified form of my invention.

In the drawings, A represents a tube of rubber or equivalent material, which is set and secured in any suitable manner in a metallic rim of the wheel, connected with which my invention is used. In the bore of this tube I insert a series of semispherical cup-shaped cushions C and D, which are arranged in pairs, the cushions C having, preferably, their concave surfaces face the outer circumference of the tube and the cushions D having their concave surfaces face the inner circumference of the same. The convex surfaces of these cushions face toward the center of the bore of the tube, and as one cushion C and one cushion D are placed in the same radial plane the centers of their convex surfaces or backs touch and support one another. If desired, I could arrange these cushions so that cushion C could alternate with a cushion D, substantially as shown in Fig. 3 of the drawings. These cushions are not exactly semispherical, but are as nearly so as it is possible to make them and have them fit within the bore of the tube. They are made hollow or solid, as desired, and are preferably made of rubber or of equally-elastic material, and while they can be separate and independent one from the other I prefer to cast them integral and have them unite wherever they touch.

Figure 3:
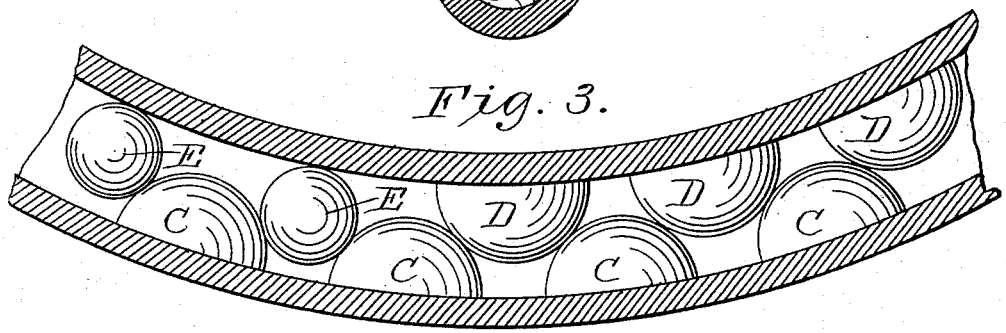

In Fig. 3 I show, in the left-hand part thereof, semispherical cushions C in conjunction with solid or hollow rubber balls E. The balls E are arranged so as to alternate with the cushions and are seated on the cushions with their inner segment bearing against the innermost circumference of the bore of the tube.

I am aware that it is an old idea to construct vehicle-tires of a tube of elastic material, the bore of which is stuffed with a suitable filling or is prevented from collapsing by the insertion into its bore of some sort of reinforcing device or devices. I am not aware, however, that a bicycle or vehicle tire has been constructed of a light tube (such as I design my tire to be made of) having its bore filled wholly or partly with cushions, which prevent its collapsing, makes a very effective cushion for overcoming the jolt and jar to both the vehicle and its rider, and at the same time makes a strong and durable tire, which, because of its interior being full of small and separate air-cells, is very light and possesses all of the advantages of that class of tires known as "pneumatic tires," without presenting any of their well-known disadvantages.

What I claim as new is—

1. A vehicle-wheel tire consisting of an elastic tube and cup-shaped cushions arranged radially in pairs back to back and one above the other within the bore thereof.

2. A vehicle-wheel tire consisting of an elastic tube and a series of cup-shaped cushions placed therein and filling the bore thereof, one-half of said cushions having their concave sides facing the rim of the wheel and the other one-half facing the tread thereof and supporting said rim-facing cushions, as set forth.

JOHN HENRY BINGHAM.

Witnesses:
A. A. HALL,
FRANK D. THOMASON.